United States Patent [19]

Kim

[11] Patent Number: 5,717,465
[45] Date of Patent: Feb. 10, 1998

[54] APPARATUS FOR CODING AN OBJECT REGION OF A VIDEO SIGNAL BY USING A REARRANGED BLOCK-BASED CODING TECHNIQUE

[75] Inventor: Jin-Hun Kim, Seoul, Rep. of Korea

[73] Assignee: Daewoo Electronics, Col, Ltd., Seoul, Rep. of Korea

[21] Appl. No.: 674,944

[22] Filed: Jul. 3, 1996

[30] Foreign Application Priority Data

May 23, 1996 [KR] Rep. of Korea ............. 96-17810

[51] Int. Cl.$^6$ .................................................. H04N 7/30
[52] U.S. Cl. .................. 348/420; 348/403; 382/250
[58] Field of Search ........................... 348/384, 390, 348/400–403, 409–412, 420; 382/232, 235, 236, 238, 243, 248–250; H04N 7/133

[56] References Cited

U.S. PATENT DOCUMENTS

| | | | |
|---|---|---|---|
| 4,796,087 | 1/1989 | Guichard et al. | 348/402 |
| 4,837,724 | 6/1989 | Borgers et al. | 348/403 |
| 4,858,005 | 8/1989 | Lodge | 348/415 |
| 5,363,146 | 11/1994 | Saunders et al. | 348/699 |
| 5,519,503 | 5/1996 | Ohki | 348/403 |
| 5,563,718 | 10/1996 | Wober et al. | 348/403 |

OTHER PUBLICATIONS

Hotter, "Object–Oriented Analysis–Synthesis Coding Based On Moving Two–Dimensional Objects", Signal Processing: Image Communication, 2, No. 4, pp. 409–428, Dec. 1990.

*Primary Examiner*—Richard Lee
*Attorney, Agent, or Firm*—Pennie & Edmonds, LLP

[57] ABSTRACT

An apparatus for coding an arbitrarily shaped object region of a video signal comprises a processing block decision circuit. The processing block decision circuit selects a processing block encompassing the object region based on the shape information to generate the processing block signal and processing block position data, wherein the processing block includes P×Q subblocks, P and Q being positive integers. The apparatus also includes a subblock rearrangement circuit. The subblock rearrangement circuit rearranges the subblocks of the processing block to generate a rearranged processing block having a minimum number of the subblocks encompassing the object region and position information representing positions of the rearranged subblocks. A transform coding circuit then converts the rearranged processing block on a subblock-by-subblock basis to a transform coded video signal to be transmitted.

9 Claims, 5 Drawing Sheets

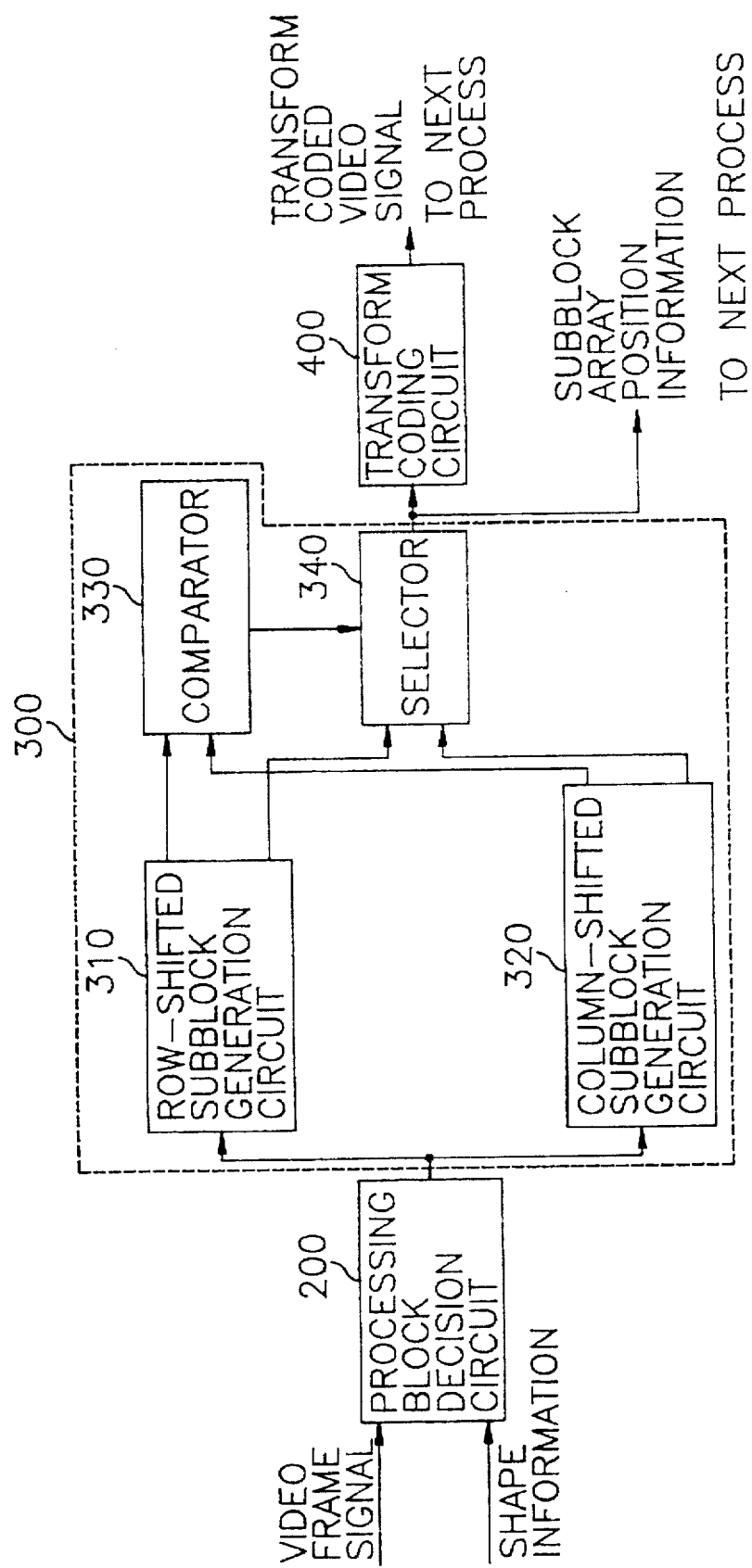

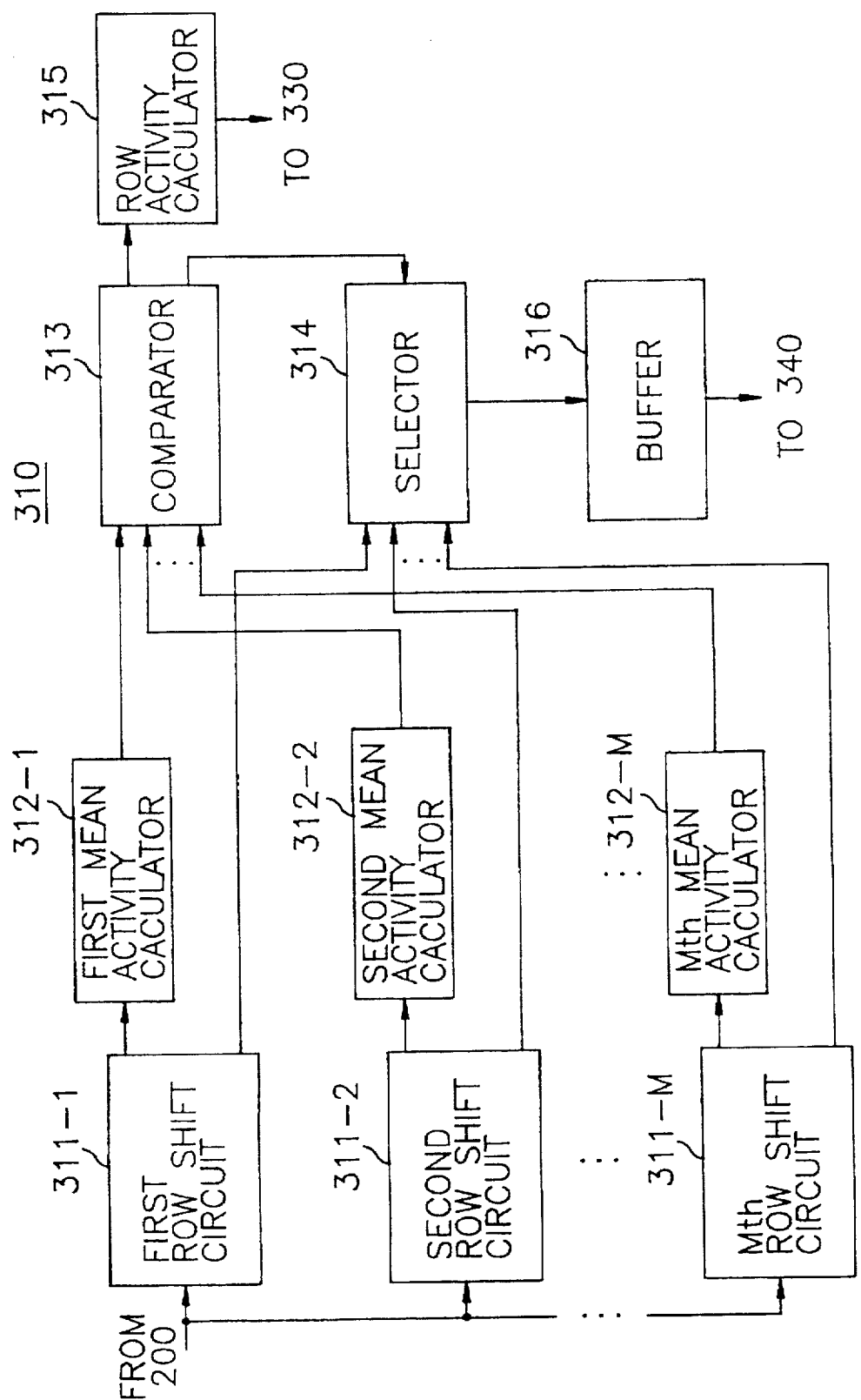

APPARATUS FOR CODING AN OBJECT REGION OF A VIDEO SIGNAL BY USING A REARRANGED BLOCK-BASED CODING TECHNIQUE

FIELD OF THE INVENTION

The present invention relates to an apparatus for encoding an object region of a video signal; and, more particularly, to an apparatus for effectively encoding an object region of a video signal by using a rearranged block-based coding technique.

DESCRIPTION OF THE PRIOR ART

In a digital television system such as video-telephone, teleconference and high definition television system, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of a data compression technique, especially in the case of a low bit-rate video signal encoder, e.g., video-telephone or teleconference system.

One of such techniques for encoding video signals for a low bit-rate encoding system is the so-called object-oriented analysis-synthesis coding technique(see Michael Hotter, "Object-Oriented Analysis-Synthesis Coding Based on Moving Two-Dimensional Objects", *Signal Processing: Image Communication*, 2, No. 4, pp. 409–428(December, 1990)).

According to the object-oriented analysis-synthesis coding technique, an input video image is first divided into two parts: i.e., one or more object regions; and a background region. Then, the background region and the object region are separately coded by using various block-based coding techniques, e.g., DCT (discrete cosine transform) and quantization, on a block-by-block basis. Specifically, since the object region may be of an arbitrary shape, a processing block encompassing the object region is used for encoding the object region by using the block-based DCT coding technique, wherein the processing block is first divided into a number of equal-sized subblocks. The equal-sized subblocks are then sequentially coded by using the DCT coding technique. In this case, in order to effectively reduce the amount of the digital data to be transmitted, the area lying outside the object region in a subblock is padded by using a certain value which is determined by using a known padding technique, e.g., an extended interpolation (EI) or a shape-adaptive (SA) DCT coding technique.

Even though it is possible to reduce the amount of the digital transmission data through the use of the EI or SA DCT coding technique, it would be more desirable or convenient to reduce the number of subblocks including the object region in order to further reduce the volume of the digital data, thereby successfully implementing the technique in a low-bit rate codec system having, e.g., a 64 kb/s transmission channel bandwidth.

SUMMARY OF THE INVENTION

It is, therefore, an object of the invention to provide an apparatus for effectively coding an object region of a video signal by using a block-based video coding circuit, capable of providing a minimum number of subblocks encompassing the object region, to thereby improve the coding efficiency of the video signal.

Another object of the present invention is to provide an apparatus having a subblock rearrangement circuit which is capable of effectively providing the minimum number of subblocks encompassing the object region by using a mean activity for the rearranged subblocks.

In accordance with the invention, there is provided an apparatus for coding an arbitrarily shaped object region of a video signal, wherein the video signal includes a zero-masked region, the object region, and shape information representing the shape of the object region, and is divided into a plurality of equal-sized subblocks, each subblock having M×M pixels with M being a positive integer, which comprises:

processing block decision means for selecting a processing block encompassing the object region based on the shape information to generate a processing block signal and processing block position data, wherein the processing block includes P×Q subblocks, P and Q being positive integers;

subblock rearrangement means for rearranging the subblocks of the processing block to generate a rearranged processing block having a minimum number of the subblocks encompassing the object region and position information representing positions of the rearranged subblocks; and transform coding means for converting the rearranged processing block on a subblock-by-subblock basis into a transform coded video signal.

BRIEF DESCRIPTION OF THE DRAWINGS

The above and other objects and features of the present invention will become apparent from the following description of preferred embodiments given in conjunction with the accompanying drawings, in which:

FIG. 1 is a schematic block diagram showing a video encoding apparatus employing a subblock rearrangement circuit in accordance with the present invention;

FIG. 3 offers a detailed block diagram of the row-shifted subblock generation circuit shown in FIG. 1.

DETAILED DESCRIPTION OF THE PREFERRED EMBODIMENTS

Referring to FIG. 1, there is shown a video encoding apparatus for encoding an object region of a video signal in accordance with the present invention. The video encoding apparatus includes a processing block decision circuit 200, a subblock rearrangement circuit 300, and a transform coding circuit 400.

A zero-masked video frame signal outputted from a video source, e.g., a video memory (not shown), is provided to the processing block decision circuit 200, wherein the zero-masked video frame signal includes at least one object region and a zero-masked region. Shape information denoting the object region is also relayed to the processing block decision circuit 200.

Figure 2A:
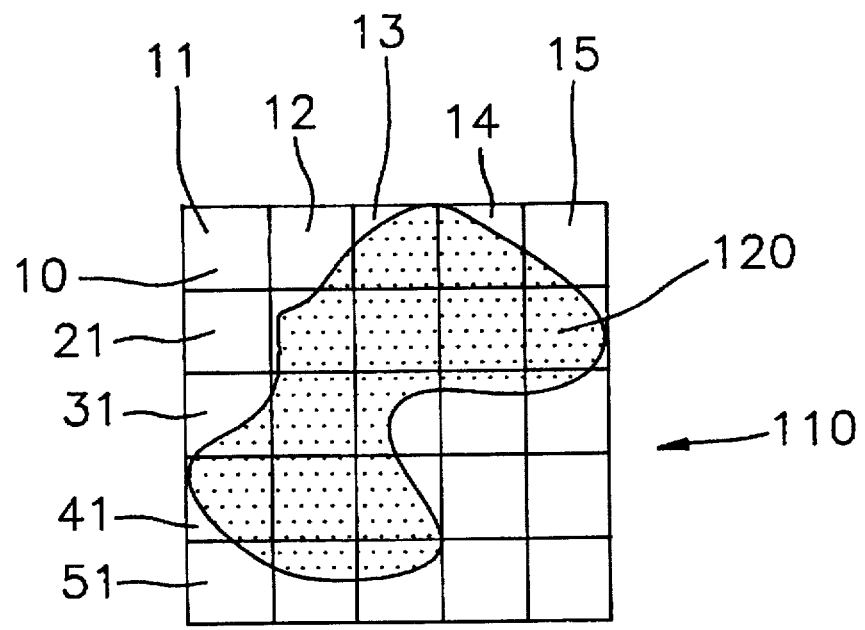
FIG. 2A describes an exemplary processing block encompassing an object region.

The processing block decision circuit 200 decides a processing block by using the zero masked video frame signal and the shape information, wherein the processing block includes a multiplicity of equal sized subblocks encompassing the object region, e.g., P×Q subblocks, P and Q being positive integers. Each of the subblocks has M×M pixels, M being a positive integer, e.g., 8×8 pixels or 16×16 pixels. The multiplicity of the subblocks is arranged in a matrix form having P number of row subblock arrays and Q number of column subblock arrays. For instance, referring to FIG. 2A, there is shown an exemplary processing block 110 which has only 5×5 subblocks encompassing an object region 120 for the sake of simplicity. The processing block 110 includes 5 row subblock arrays 10, 21, 31, 41 and 51, each having 5 subblocks, and 5 column subblock arrays 11, 12, 13, 14 and 15, each having 5 subblocks.

At the processing block decision circuit 200, a processing block signal representing the processing block and processing block position information denoting the position of the processing block is generated and provided to the subblock rearrangement circuit 300, wherein the subblock rearrangement circuit 300 includes a row-shifted subblock generation circuit 310, a column-shifted subblock generation circuit 320, a comparator 330 and a selector 340.

At the subblock rearrangement circuit 300, the subblocks of the processing block are rearranged; and a rearranged processing block signal and rearranged subblock array position information are generated, wherein the rearranged processing block signal includes the minimum number of the subblocks encompassing the object region. In the following, a process to obtain the rearranged processing block having the minimum number of the subblocks encompassing the object region is described in detail.

At the row-shifted subblock generation circuit 310, each of the row subblock arrays is first shifted to obtain a row rearranged processing block entailing a minimum mean activity and then rearranged subblock array position information representing positions of the shifted row subblock arrays and a row mean activity signal denoting the mean activity of the row rearranged processing block are generated. Similarly, at the column-shifted subblock generation circuit 320, each of the column subblock arrays is first shifted to obtain a column rearranged processing block entailing another minimum mean activity and then column subblock array position information representing positions of the shifted column subblock arrays and a column activity signal denoting the activity of the second rearranged processing block are generated. Details of the row-shifted and the column-shifted subblock generation circuits 310 and 320 will be described with reference to FIGS. 3 and 4.

The row and the column rearranged processing blocks, and the row and the column subblock array position information are provided to the selector 340, while the row and column mean activity signals are relayed to the comparator 330. At the comparator 330, the row mean activity signal and the column mean activity signal are compared and a rearranged processing block having a mean activity smaller than the other is selected to generate a selection signal representing the selected rearranged processing block.

At the selector 340, in response to the selection signal from the comparator 330, the selected rearranged processing block is provided as the rearranged processing block to be transmitted to the transform coding circuit 400. On the other hand, the subblock array position information of the selected rearranged processing block is also relayed via the selector 340 to a known next processor, e.g., a variable length coder (not shown).

The transform coding circuit 400 processes the rearranged processing block outputted from the selector 340 to provide a set of transform coefficients to the next processor. As is known in the art, the transform coding circuit 400 is implemented by using a known discrete cosine transform (DCT) coding circuit employing a known extended interpolation (EI) technique or a known shape adaptive (SA) DCT coding technique. The transform coding circuit can also include a known quantization circuit.

Figure 4:
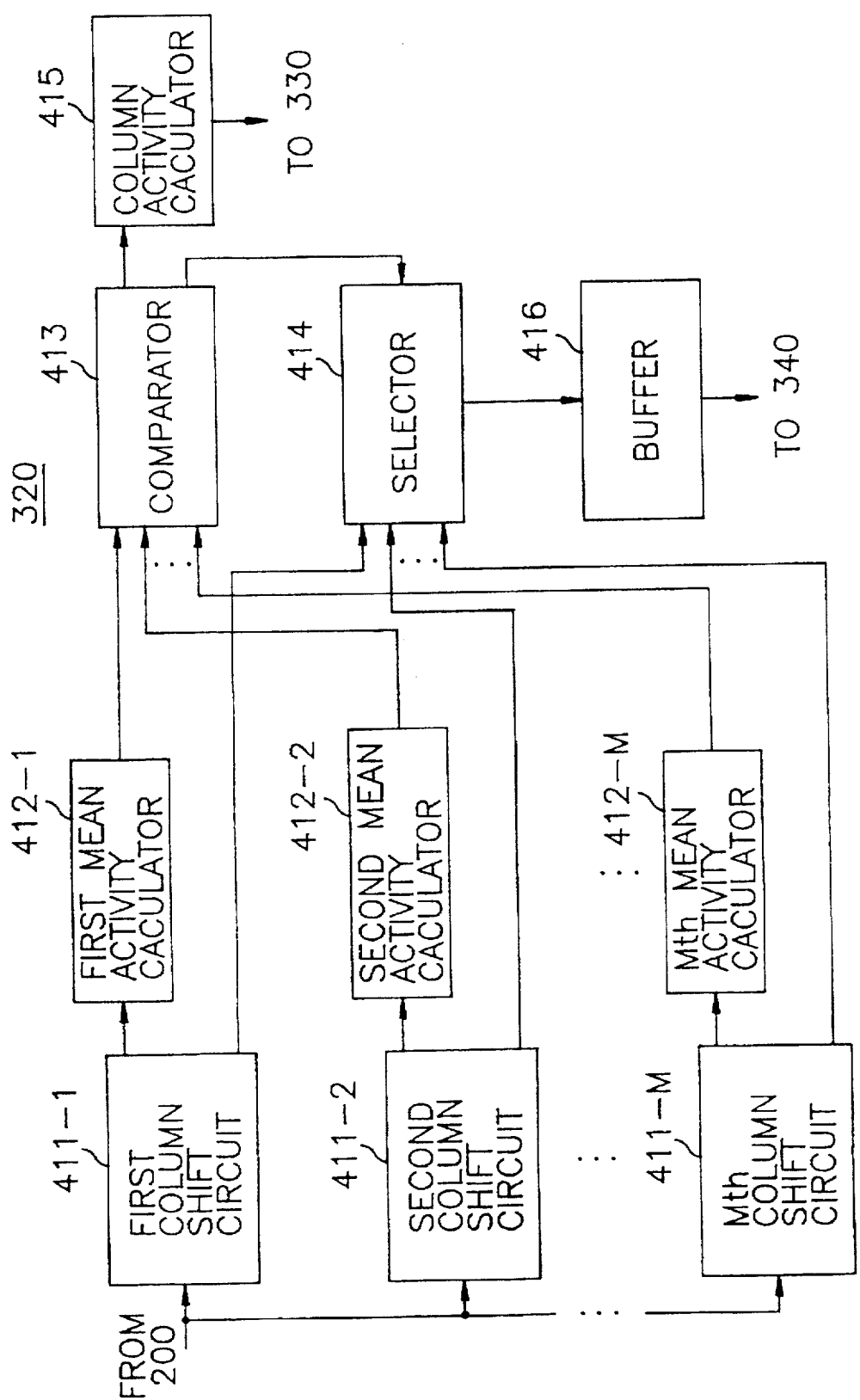
FIG. 4 demonstrates a detailed block diagram of the column-shifted subblock generation circuit shown in FIG. 1.

Referring to FIGS. 3 and 4, there are illustrated detailed block diagrams of the row-shifted and the column-shifted subblock generation circuits 310 and 320 shown in FIG. 1. As shown in FIG. 3, the row-shifted subblock generation circuit 310 includes M number of row shift circuits 311-1, 311-2, ..., 311-M, M number of mean activity calculators 312-1, 312-2, ..., 312-M, a comparator 313, a selector 314, a row activity calculation circuit 315, and a buffer 316.

Figure 2B:
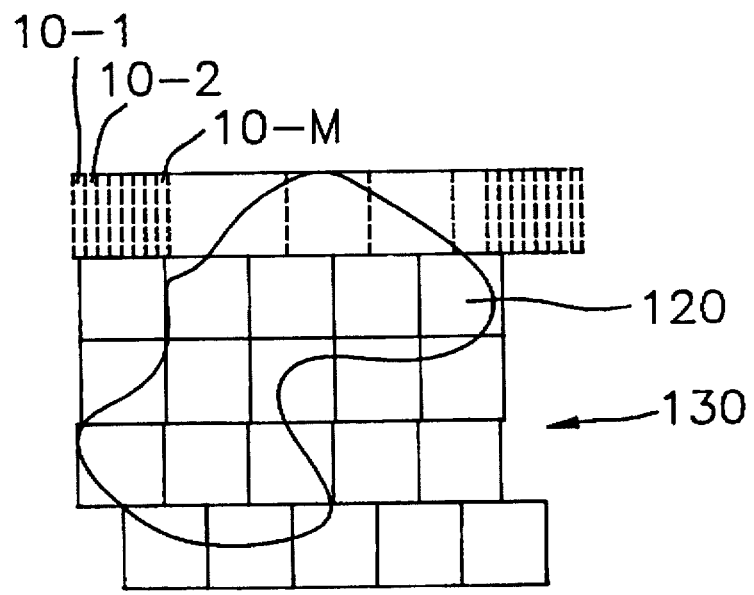
FIG. 2B shows an exemplary row rearranged processing block.

P number of the row subblock arrays outputted from the processing block decision circuit 200 shown in FIG. 1 are sequentially relayed to the row shift circuits 311-1 to 311-M. The processing block position information is also provided to the row shift circuits 311-1 to 311-M. Although, FIG. 3 is intended to show M number of the row shift circuits, only 3 circuits are depicted for the sake of simplicity. The row shift circuits 311-1, 311-2, ..., and 311-M receive a row subblock array simultaneously and each shifts the row subblock array by a predetermined pixel position, e.g., one pixel, to generate a shifted row subblock array. For instance, referring to FIG. 2B, the row subblock array 10 is simultaneously relayed to the row shift circuits 311-1 to 311-M and a first row shift circuit 311-1 provides a first shifted subblock array 10-1 shifted by one pixel position in row direction. Similarly, a second row shift circuit 311-2 and an Mth row shift circuit 311-M provide a second shifted subblock array 10-2 shifted by two pixel positions and an Mth shifted subblock array 10-M shifted by M pixel positions in row direction, respectively. If the subblock is, as described above, formed of 8×8 pixels, M is 8.

The row shift circuits 311-1 to 311-M provides respective subblock array position information and a set of shifted subblock arrays to the selector 314 and to the corresponding mean activity calculator 312-1 to 312-M, respectively. Each of the mean activity calculator 312-1 to 312-M provides the comparator 313 with a mean activity for each of the shifted subblock arrays. A mean activity AV for each of the subblock is represented as follows:

$$AV = \frac{1}{N} \sum_{i=1}^{M} \sum_{j=1}^{M} (H(i,j) - \overline{m})^2$$

wherein N=M×M, H(i,j) represents the luminance level of the pixel at the location(i,j), i and j being positive integers representing the horizontal and the vertical position of the pixel in the subblock, respectively, and $\overline{m}$ is the mean value of luminance levels for pixels in each corresponding subblock.

At the comparator 313, the mean activity values are compared with each other to select one of the shifted subblock arrays with the minimum mean activity. For example, if the second shifted subblock array has the minimum mean activity value among the shifted subblock arrays, the second shifted subblock is selected and the comparator 313 generates a selection signal denoting the second shifted subblock array as the selected shifted subblock array. The selection signal is then relayed to the selector 314 which, in response to the selection signal, provides the selected shifted subblock array and the corresponding subblock array position information to the buffer 316. The comparator 313 also provides the row activity calculator 315 with the mean activity value of the selected shifted subblock array. The above process is repeated until all of the P row subblock arrays (e.g., 10, 21, 31, 41 and 51 of FIG. 2A) are processed. The row activity calculator 315 accumulates the mean activity values for each selected shifted subblock array as an accumulated mean activity value and then divides the accumulated mean activity value by the total number of selected shifted subblock arrays to generate the row mean activity signal which is transmitted to the comparator 330 shown in FIG. 1. On the other hand, the buffer 316 temporarily stores the selected shifted subblock arrays until all of the selected shifted subblock arrays are stored and sequentially generates the stored subblocks as the row rearranged processing block (e.g. 130 of FIG. 2B) which is relayed to the selector 340 shown in FIG. 1.

Referring to FIG. 4, the column-shifted subblock generation circuit 320 includes M number of column shift circuits 411-1, 411-2, . . . , 411-M, M number of mean activity calculators 412-1, 412-2, . . . , 412-M, a comparator 413, a selector 414, a column activity calculation circuit 415, and a buffer 416.

Figure 2C:
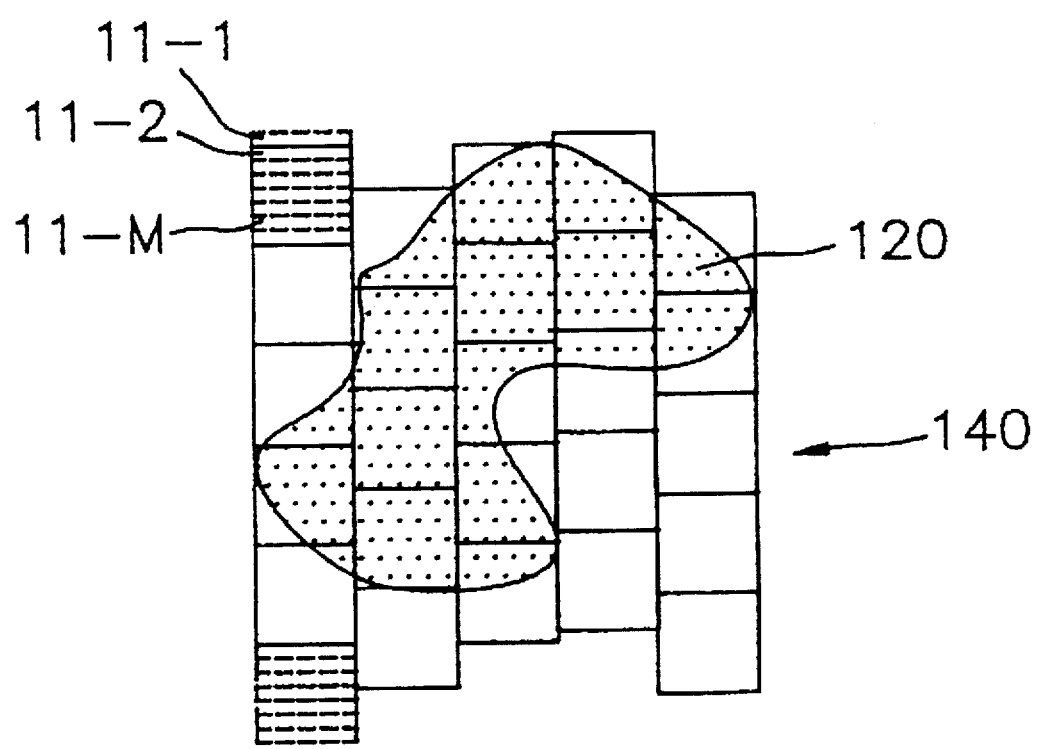
FIG. 2C depicts an exemplary column rearranged processing block.

Q number of the column subblock arrays outputted from the processing block decision circuit 200 shown in FIG. 1 are sequentially relayed to the column shift circuits 411-1 to 411-M. The processing block position information is also provided to the column shift circuits 411-1 to 411-M. Although, FIG. 4 is also intended to show M number of the column shift circuits, only 3 circuits are depicted for the sake of simplicity. The column shift circuits 411-1 to 411-M receive a column subblock array simultaneously and each shifts the column subblock array by a predetermined pixel position, e.g., one pixel, to generate a shifted column subblock array. For instance, referring to FIG. 2C, the column subblock array 11 is simultaneously relayed to the column shift circuits 411-1 to 411-M and a first column shift circuit 411-1 provides a first shifted subblock array 11-1 shifted by one pixel position in column direction. Similarly, a second column shift circuit 411-2 and an Mth column shift circuit 411-M provide a second shifted subblock array 11-2 shifted by two pixel positions and an Mth shifted subblock array 11-M shifted by M pixel positions in column direction, respectively. If the subblock is, as described above, formed of 8×8 pixels, M is 8.

The column shift circuits 411-1 to 411-M provides respective subblock array position information and a set of shifted subblock arrays to the selector 414 and to the corresponding mean activity calculator 412-1 to 412-M, respectively. Each of the mean activity calculator 412-1 to 412-M provides the comparator 413 with a mean activity for each of the shifted subblock arrays. A mean activity AV for each of the subblock is represented as follows:

$$AV = \frac{1}{N} \sum_{i=1}^{M} \sum_{j=1}^{M} (H(i,j) - \overline{m})^2$$

wherein N=M×M, H(i,j) represents the luminance level of the pixel at the location(i,j), i and j being positive integers representing the horizontal and the vertical position of the pixel in the subblock, respectively, and $\overline{m}$ is the mean value of luminance levels for pixels in each corresponding subblock.

At the comparator 413, the mean activity values are compared with each other to select one of the shifted subblock arrays with the minimum mean activity. For example, if the second shifted subblock array has the minimum mean activity value among all the shifted subblock arrays, the second shifted subblock is selected and the comparator 413 generates a selection signal denoting the second shifted subblock as the selected shifted subblock array. The selection signal is then relayed to the selector 414 which, in response to the selection signal, provides the selected shifted subblock array and the corresponding subblock array position information to the buffer 416. The comparator 413 also provides the column activity calculator 415 with the mean activity value of the selected shifted subblock array. The above process is repeated until all of the Q column subblock arrays (e.g.,11, 12, 13, 14 and 15 of FIG. 2A) are processed. The column activity calculator 415 accumulates the mean activity values for each selected shifted subblock array as an accumulated mean activity value and then divides the accumulated mean activity value by the total number of selected shifted subblock arrays to generate the column mean activity signal which is transmitted to the comparator 330 shown in FIG. 1. On the other hand, the buffer 416 temporarily stores the selected shifted subblock arrays until all of the selected shifted subblock arrays are stored and sequentially generates the stored subblocks as the column rearranged processing block (e.g., 140 of FIG. 2B) which is relayed to the selector 340 shown in FIG. 1.

Using the subblock rearrangement circuit in accordance with the present invention, the number of subblocks encompassing the object region to be coded is effectively minimized so that data to be coded by the block-based coding technique, e.g., DCT coding technique can be greatly reduced to thereby improve the coding efficiency of the video encoder. Furthermore, the minimum number of subblocks encompassing the object region can be effectively achieved by using mean activity calculation technique.

While the present invention has been described with respect to the particular embodiments, it will be apparent to those skilled in the art that various changes and modifications may be made without departing from the spirit and scope of the invention as defined in the following claims.

What is claimed is:

1. An apparatus for coding an arbitrarily shaped object region of a video signal, wherein the video signal includes a zero- masked region, the object region, and shape information representing the shape of the object region; and is divided into a plurality of equal-sized subblocks, each of the subblocks having M×M pixels with M being a positive integer, which comprises:

processing block decision means for selecting a processing block encompassing the object region based on the shape information to generate a processing block signal and processing block position data, wherein the processing block includes P×Q subblocks, P and Q being positive integers;

subblock rearrangement means for rearranging the subblocks of the processing block to generate a rearranged processing block having a minimum number of subblocks encompassing the object region and position information representing the positions of the rearranged subblocks;

transform coding means for converting the rearranged processing block on a subblock-by-subblock basis into a transform-coded video signal; and wherein the processing block includes P number of row subblock arrays and Q number of column subblock arrays; and the subblock rearrangement means includes:

row-shifted subblock generation means, sequentially receiving the P number of row subblock arrays, for shifting each of the row subblock arrays in the row direction to generate a row rearranged processing block entailing a minimum mean activity, row subblock array position data representing the positions of row rearranged subblock arrays, and a row activity signal denoting the mean activity of the row rearranged processing block;

column-shifted subblock generation means, sequentially receiving the Q number of column subblock arrays, for shifting each of the column subblock arrays in the column direction to generate a column rearranged processing block entailing a minimum mean activity, column subblock array position data representing the positions of column rearranged subblock arrays, and a column activity signal denoting the mean activity of the column rearranged processing block; and comparison means for comparing the row activity signal with the column activity signal to select one of the row and the column rearranged processing blocks as the rearranged processing block, and either the row or column subblock array position data of the selected rearranged processing block as the position information, wherein said selected rearranged processing block has a mean activity smaller than the remaining rearranged processing block.

2. The apparatus as recited in claim 1, wherein the row-shifted subblock generation means includes:

M number of row shifter means receiving one of the row subblock arrays and the processing block position data, each for shifting said received one of the row subblock arrays by a predetermined position based on the processing block position data to produce a shifted row subblock array and shifted subblock array position data;

M number of mean activity calculation means, each for calculating a mean activity of the shifted row subblock array outputted from a corresponding row shifter means to provide a mean activity signal for the corresponding row subblock array;

comparison means for comparing the mean activity signals of the shifted row subblock arrays with each other to select a shifted row subblock array with a minimum mean activity and corresponding shifted subblock array position data and for generating the selected shifted row subblock array and the corresponding shifted subblock array position data;

row mean activity calculation means for accumulating the mean activity signals of all selected shifted row subblock arrays as an accumulated mean activity signal and for dividing the accumulated mean activity signal by the total number of the selected shifted row subblock arrays to generate a row mean activity signal, and buffer means for temporally storing the selected shifted row subblock arrays and the corresponding shifted subblock array position data until all of the row subblock arrays are processed to generate the selected shifted row subblock arrays as the row rearranged processing block and the corresponding shifted subblock array position data as the row subblock array position data.

3. The apparatus as recited in claim 2, the comparison means for comparing the row activity signal with the column activity signal includes a comparator and a selector.

4. The apparatus as recited in claim 3, wherein the transform coding means includes a discrete cosine transform circuit.

5. The apparatus as recited in claim 4, wherein the transform coding means includes a shape adaptive discrete cosine transform circuit.

6. The apparatus as recited in claim 1, wherein the column-shifted subblock generation means includes:

M number of column shifter means receiving one of the column subblock arrays and the processing block position data, each for shifting said received one of the column subblock arrays by a predetermined position based on the processing block position data to produce a shifted column subblock array and shifted subblock array position data;

M number of mean activity calculation means, each for calculating a mean activity of the shifted column subblock array outputted from a corresponding column shifter means to provide a mean activity signal for the corresponding column subblock array;

comparison means for comparing the mean activity signals of the shifted column subblock arrays with each other to select a shifted column subblock array with a minimum mean activity and corresponding shifted subblock array position data and for generating the selected shifted column subblock array and the corresponding shifted subblock array position data;

column mean activity calculation means for accumulating the mean activity signals of all selected shifted column subblock arrays as an accumulated mean activity signal and for dividing the accumulated mean activity signal by the total number of the selected shifted column subblock arrays to generate a column mean activity signal; and buffer means for temporally storing the selected shifted column subblock arrays and the corresponding shifted subblock array position data until all of the column subblock arrays are processed to generate the selected shifted column subblock arrays as the column rearranged processing block and the corresponding shifted subblock array position data as the column subblock array position data.

7. The apparatus as recited in claim 6, the comparison means for comparing the row activity signal with the column activity signal includes a comparator and a selector.

8. The apparatus as recited in claim 7, wherein the transform coding means includes a discrete cosine transform circuit.

9. The apparatus as recited in claim 8, wherein the transform coding means includes a shape adaptive discrete cosine transform circuit.

* * * * *